Dec. 30, 1941.    J. T. PHILLIPS    2,268,343
WELDING METHOD
Filed Dec. 20, 1938
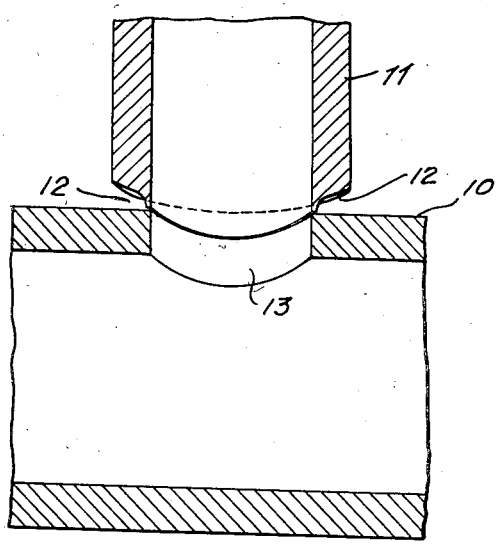
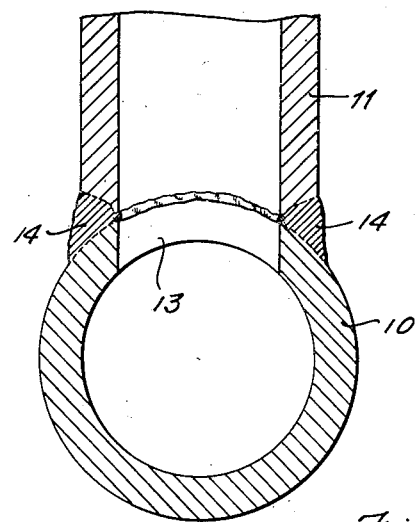
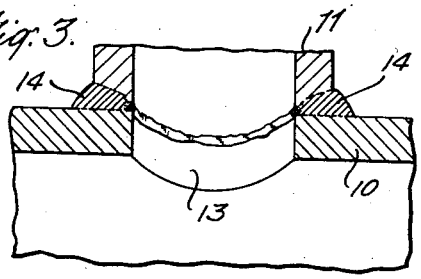
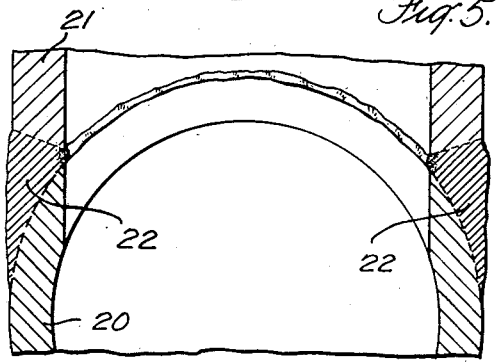
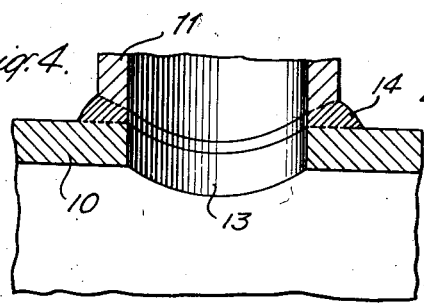
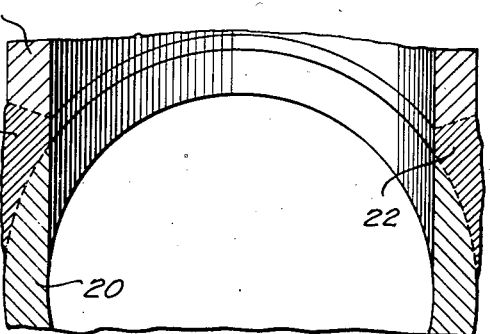
INVENTOR
JOHN T. PHILLIPS.
BY
ATTORNEY Patented Dec. 30, 1941

2,268,343

UNITED STATES PATENT OFFICE 2,268,343

WELDING METHOD

John T. Phillips, Plainfield, N. J., assignor to Foster Wheeler Corporation, New York, N. Y., a corporation of New York Application December 20, 1938, Serial No. 246,766

6 Claims. (Cl. 29—157)

This invention relates to welding and more particularly pertains to electric arc or gas welding of tubular members such as nozzles and the like, to pressure vessels, conduits, or other tubular members.

It is well known that full penetration at the root or bottom of a welded joint is difficult to obtain without leaving unfused portions in the weld in the region of the first bead or a portion thereof. Since the weld metal at this point is usually of a porous or coarse grained nature, it is common practice to remove the first bead or at least a part thereof and replace it with weld metal deposited from the opposite side of the joint from which the first welding was done. However, this method cannot be used with small diameter pipes or vessels because the welder cannot get inside the pipe or vessel to perform this operation.

The present invention overcomes this difficulty and provides a method of welding nozzles or tubular connectors to vessels or pipes of relatively small diameter, which will provide a sound and fully refined welded joint by welding from one side only.

The invention will be understood from the following description when considered in connection with the accompanying drawing forming a part thereof, and in which:

Fig. 1 is a sectional view showing a pipe and nozzle prepared for welding in accordance with the invention;

Fig. 2 is a sectional view taken at right angles to Fig. 1, showing the completed weld;

Fig. 3 is a sectional view similar to Fig. 1 showing the completed weld;

Fig. 4 is a sectional view similar to Fig. 3 showing the finished joint;

Fig. 5 is a sectional view similar to Fig. 2 but illustrating a further method of welding, and Fig. 6 is a sectional view similar to Fig. 5 but showing the finished joint.

Like characters of reference refer to the same parts throughout the several views.

The invention will be disclosed in connection with the welding of a nozzle to a pipe as illustrated in Figs. 1 to 4, and the welding together of two pipe sections so that the inside and outside diameters are the same, as illustrated in Figs. 5 and 6, but it will be understood that the principles of the invention are of general application and may be employed in the welding of any articles, whether tubular, plane, or otherwise.

Referring to Figs. 1 to 4 of the drawing, reference character 10 designates a relatively thick walled pipe section to which a thick walled nozzle 11 is to be welded. In preparing the nozzle and pipe for welding, a nozzle is selected with an outside diameter of the desired dimension, but with an inside diameter ¼" or more smaller than is necessary for the required strength and pressure. The end of the nozzle which is to be welded to the pipe 10 is next machined, burned or ground to fit the outside diameter of the pipe, after which the welding groove 12 is provided by machining, burning or chipping. Thereafter, an opening 13 is made in the pipe 10, the diameter of which is equal to the inside diameter of the nozzle 11, and the nozzle and pipe are placed in the position shown in Fig. 1 ready for welding. Groove 12 is then filled with weld metal deposited from a fusible electrode by an electric arc, or gas, to form the weld 14. The welding is done entirely from the outside of the pipe and nozzle.

To eliminate the first weld bead or a portion thereof and thereby remove the unfused or porous metal at the root of the weld, the nozzle 11 is bored throughout its length by any suitable means to the finished inside diameter, during which operation the unfused weld metal is entirely removed as shown in Fig. 4. The weld metal remaining is sound and refined and extends throughout the thickness of the joint.

Practice of the invention produces a welded joint which can be examined practically by the use of the X-ray or gamma ray. This is due to the position of the joint in relation to welded parts and also to the fact that the root of the weld has been machined back to sound metal.

The same procedure may be used in welding parts together which are to have the same finished inside and outside diameters as illustrated in Figs. 5 and 6. The method employed is the same as previously described excepting that pipe section 21 has a smaller inside diameter than the desired finished diameter, prior to welding, and after the weld 22 has been completed, pipe section 21 is bored to the inside diameter of section 20. The boring of the pipe section 21 will remove the first weld bead or more, and will thus eliminate the unfused parts of the weld joint, thus retaining only sound and refined weld metal which extends throughout the thickness of the joint. In the finished joint both sections 20 and 21 will have the same inside and outside diameters.

Although the methods herein disclosed are preferred methods embodying the invention, it will be understood that changes may be made in the individual steps of the methods or their sequence without departing from the principles of the invention. Accordingly, the invention is not to be limited excepting by the scope of the appended claims.

What is claimed is:

1. The method of welding a tubular member to another member which comprises selecting a tubular member having a cross-sectional flow area smaller than desired for the finished member, providing an opening in a wall of the other member of substantially the same flow area, removing metal from the tubular member in the zone of the desired weld to provide with the other member a welding groove, placing the members in position for welding, depositing fused weld metal in said groove from the outside only of the tubular member to make the weld, and removing sufficient metal from the interior of the tubular member to provide the desired finished cross-sectional flow area and to remove the unfused weld metal at the root of the weld.

2. The method of welding a tubular member to another member which comprises selecting a tubular member having a cross-sectional flow area smaller than desired for the finished member, providing an opening in a wall of the other member of substantially the same flow area, the tubular member being formed in the zone of the desired weld to provide with the other member a welding groove, placing the members in position for welding, depositing fused weld metal in said groove from the outside only of the tubular member to make the weld, and removing sufficient metal from the interior of the tubular member to provide the desired finished cross-sectional flow area and to remove the unfused weld metal at the root of the weld.

3. The method of welding one tubular member to another tubular member which comprises selecting one member having a cross-sectional flow area smaller than desired for the finished member, selecting another member having the desired cross-sectional flow area, providing an opening in a wall of said other member of substantially the same flow area as said one member, said one member being formed in the zone of the desired weld to provide with the other member a welding groove, placing the members in position for welding, depositing fused weld metal in said groove from the outside only of the tubular member to make the weld, and removing sufficient metal from the interior of said one member to provide the desired finished cross-sectional flow area therefor and to remove the unfused weld metal at the root of the weld.

4. The method of welding one tubular member to another tubular member which comprises selecting one member having a wall thickness greater than desired for the finished member, selecting another member having the desired wall thickness, providing an opening in the wall of said other member of substantially the same flow area as that of said one member, said one member being formed in the zone of the desired weld to provide with the other member a welding groove, placing the members in position for welding, depositing fused weld metal in said groove from the outside only of the tubular member to make the weld, and removing sufficient metal from the interior of said one member to provide the desired finished wall thickness therefor and to remove the unfused weld metal at the root of the weld.

5. The method of welding a first member to a second member which comprises selecting a first member with a wall thickness greater than is desired for the finished member, said first member being formed in the zone of the desired weld to provide a welding groove with the other member, placing the members in position for welding, depositing fused weld metal in said groove from one side only of said first member to make the weld, and removing sufficient metal from the other side of said first member to provide the desired finished wall thickness and to remove the unfused weld metal at the root of the weld.

6. The method of welding a tubular member to another member which comprises selecting a tubular member having a cross-sectional flow area smaller than desired for the finished member, providing an opening in a wall of the other member of substantially the same flow area, the tubular member being formed in the zone of the desired weld to provide with the other member a welding groove having its bottom adjacent the inner wall of the tubular member and its mouth at the outer wall thereof, placing the members in position for welding, depositing fused weld metal in said groove from the outside only of the tubular member to make the weld, and removing sufficient metal from the inner circumferential portion of the tubular member to provide the desired finished cross-sectional flow area and to remove the unfused weld metal at the root of the weld.

JOHN T. PHILLIPS.